(12) United States Patent
Arikawa (10) Patent No.: US 11,022,150 B2
(45) Date of Patent: Jun. 1, 2021

(54) ACCUMULATOR

(71) Applicant: EAGLE INDUSTRY CO., LTD., Tokyo (JP)

(72) Inventor: Tatsuhiro Arikawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 16/477,157

(22) PCT Filed: Jan. 26, 2018

(86) PCT No.: PCT/JP2018/002399
§ 371 (c)(1),
(2) Date: Jul. 10, 2019

(87) PCT Pub. No.: WO2018/143065
PCT Pub. Date: Aug. 9, 2018

(65) Prior Publication Data
US 2019/0368513 A1    Dec. 5, 2019

(30) Foreign Application Priority Data

Feb. 3, 2017   (JP) .............................. JP2017-018945

(51) Int. Cl.
*F16L 55/04*        (2006.01)
*F15B 1/02*         (2006.01)
(Continued)

(52) U.S. Cl.
CPC .............. *F15B 1/021* (2013.01); *F15B 1/103* (2013.01); *F16L 55/053* (2013.01)

(58) Field of Classification Search
CPC .... F15B 1/14; F15B 1/103; F15B 1/10; F15B 2201/20; F15B 1/106; F15B 20/007;
(Continued)

(56) References Cited

U.S. PATENT DOCUMENTS 3,456,673 A     7/1969  Legrand ......................... 137/202
3,675,684 A  *  7/1972  Mercier .................. F16L 41/02
                                                                 138/30
(Continued)

FOREIGN PATENT DOCUMENTS

CN       103842661       6/2014   ................ F15B 1/08
CN       103998792       8/2014   ................ F15B 1/08
(Continued)

OTHER PUBLICATIONS

International Preliminary Report on Patentability issued in application No. PCT/JP2018/002399, dated Aug. 15, 2019 (7 pgs).
(Continued)

*Primary Examiner* — James F Hook
(74) *Attorney, Agent, or Firm* — Hayes Soloway P.C.

(57) ABSTRACT

An accumulator a housing having a sealing face and a fluid inlet/outlet passage; a bellows fixed at least one end to the housing such that an inner space of the housing such that an inner space of the housing is hermetically partitioned by the bellows into an interior and an exterior of the bellows, the bellows including a bellows main body capable of expanding and contracting and a bellows cap including an annular seal holder, and a sealing member formed by covering a disc-shaped substrate with an elastic body that is opposed to and capable of being closely attached to the sealing face of the housing. At least a center part of a surface of the substrate opposing the sealing face is a curved surface having an arc shape in a sectional view.

19 Claims, 6 Drawing Sheets

(51) Int. Cl.
*F15B 1/10* (2006.01)
*F16L 55/053* (2006.01)

(58) Field of Classification Search
CPC .......... F15B 2201/3153; F15B 2201/41; F15B 1/021; F16L 55/053
USPC ...................................................... 138/30, 31
See application file for complete search history.

(56) References Cited

U.S. PATENT DOCUMENTS

| | | | | |
|---|---|---|---|---|
| 4,234,017 A * | 11/1980 | Mercier | ................... | F15B 1/14 138/30 |
| 4,287,916 A * | 9/1981 | Sugimura | ................. | F15B 1/20 138/30 |
| 4,492,013 A * | 1/1985 | Porel | ...................... | F15B 1/106 138/30 |
| 4,526,205 A * | 7/1985 | Sugimura | ............. | F16L 55/053 138/30 |
| 5,215,124 A * | 6/1993 | Hattori | ...................... | F15B 1/10 138/26 |
| 7,810,522 B1 * | 10/2010 | Nakaoka | ............... | F16L 55/053 138/31 |
| 9,027,600 B2 * | 5/2015 | Yamashita | ............ | F15B 20/007 138/31 |
| 9,188,139 B2 | 11/2015 | Yoshihara | ................. | F15B 1/08 |
| 9,328,746 B2 | 5/2016 | Hyodo et al. | ........... | F15B 1/103 |
| 9,377,031 B2 | 6/2016 | Miyake | ................... | F15B 1/103 |
| 10,077,787 B2 | 9/2018 | Arikawa | ................ | F15B 1/103 |
| 10,465,718 B2 | 11/2019 | Arikawa | ................ | F15B 1/106 |
| 10,480,539 B2 | 11/2019 | Arikawa | ................ | F15B 1/103 |
| 2003/0016209 A1 | 6/2003 | Umetsu et al. | ................. | 138/31 |
| 2011/0226370 A1 | 9/2011 | Arikawa et al. | ................ | 138/30 |
| 2012/0006438 A1 * | 1/2012 | Nakaoka | ................ | F15B 1/103 138/30 |
| 2014/0311604 A1 * | 10/2014 | Yoshihara | ............. | F15B 20/007 138/30 |
| 2015/0204357 A1 * | 7/2015 | Hyodo | .................... | F15B 1/103 138/30 |
| 2015/0240839 A1 | 8/2015 | Mizukami | ............... | F15B 1/103 |
| 2018/0306210 A1 | 10/2018 | Arikawa | ................ | F15B 1/103 |
| 2019/0360503 A1 | 11/2019 | Arikawa | ................... | F15B 1/14 |
| 2019/0368513 A1 | 12/2019 | Arikawa | ................ | F15B 1/103 |

FOREIGN PATENT DOCUMENTS

| | | | |
|---|---|---|---|
| CN | 104583606 | 4/2015 | ............... F15B 1/08 |
| CN | 106030121 | 10/2016 | ............... F15B 1/08 |
| JP | 2002155901 | 5/2002 | ............. B60T 17/00 |
| JP | 2003222101 | 8/2003 | ............... F15B 1/08 |
| JP | 2006010005 | 1/2006 | ............... F15B 1/08 |
| JP | 2007092782 | 4/2007 | ............... F15B 1/08 |
| JP | 3148349 | 2/2009 | ............... F15B 1/08 |
| JP | 2009236137 | 10/2009 | ............... F15B 1/24 |
| JP | 4384942 | 12/2009 | ............... F15B 1/08 |
| JP | 2010121637 | 6/2010 | ............... F15B 1/08 |
| JP | 2012097829 | 5/2012 | ............... F15B 1/08 |
| JP | 2015158223 | 9/2015 | ............... F15B 1/08 |
| WO | WO2013187165 | 12/2013 | ............... F15B 1/08 |

OTHER PUBLICATIONS

International Search Report (w/translation) and Written Opinion (w/machine translation) issued in application No. PCT/JP2018/002399, dated Apr. 10, 2018 (12 pgs).
U.S. Appl. No. 16/480,653, filed Jul. 24, 2019, Arikawa.
U.S. Appl. No. 16/480,473, filed Jul. 24, 2019, Arikawa.
International Preliminary Report on Patentability issued in application No. PCT/JP2018/002111, dated Aug. 15, 2019 (6 pgs).
International Preliminary Report on Patentability issued in application No. PCT/JP2018/002400, dated Aug. 15, 2019 (8 pgs).
International Search Report (w/translation) and Written Opinion (w/machine translation) issued in application No. PCT/JP2018/002400, dated Apr. 10, 2018 (12 pgs).
Chinese Office Action (w/translation) issued in application No. 201880008446.5, dated Jan. 2, 2020 (12 pgs).
Chinese Office Action (w/translation) issued in application No. 201880008446.5, dated Jul. 16, 2020 (14 pgs).
Office Action issued in U.S. Appl. No. 16/480,473, dated Aug. 6, 2020, 32 pages.
Office Action issued in U.S. Appl. No. 16/480,653, dated Aug. 6, 2020, 27 pages.
European Search report issued in related European Application 18748030.6, dated Oct. 20, 2020 (8 pages).
European Search report issued in related European Application 18748451.4, dated Oct. 27, 2020 (7 pages).
U.S. Appl. No. 16/477,157, filed Jul. 10, 2019, Arikawa.
Chinese Official Action issued in related Chinese Application 201880008542.X, dated Nov. 23, 2020 (10 pages).

* cited by examiner

ACCUMULATOR

TECHNICAL FIELD

The present invention relates to an accumulator used in an automobile hydraulic system, an industrial equipment hydraulic system, etc., as a pressure storage device, a pulsation damper, etc.

BACKGROUND ART

In a hydraulic circuit of a hydraulic control device for an automobile, an industrial equipment, etc., an accumulator for performing pressure storage, pulsation damping (buffering), etc. is provided. In such an accumulator, a bellows is arranged in a housing, the bellows comprises a bellows main body whose fixed end is welded and fixed to the housing, and a bellows cap attached to the other end of the bellows main body, and by the bellows main body and the bellows cap, an internal space of the housing is partitioned into a gas chamber in which a gas is enclosed, and a liquid chamber communicating with a fluid inlet/outlet passage which is connected to the hydraulic circuit in a sealed state. In the bellows, upon receiving a liquid flowing into the liquid chamber from the hydraulic circuit via the fluid inlet/outlet passage, the bellows main body is expanded and contracted so as to balance gas pressure in the gas chamber and liquid pressure in the liquid chamber, so that a pressure storage operation, a pulsation damping operation, etc. is performed (refer to Patent Citation 1).

In the accumulator disclosed in Patent Citation 1, on the outer face side (liquid chamber side) of the bellows cap of the bellows, a sealing member formed by a substrate which is made by a metal disc plate and an elastic member vulcanization bonded to the substrate, the elastic member that covers a surface of the substrate is held by an annular seal holder. By this, for example, in accordance with discharge of the liquid stored in the liquid chamber, the bellows is expanded by the gas pressure in the bellows, and the sealing member is closely attached to a sealing face of a partition wall provided in the liquid chamber. Thereby, it is possible to close through holes projecting on the sealing face of the partition wall and communicating with the fluid inlet/outlet passage. Therefore, by locking part of the liquid in the liquid chamber, it is possible to balance the liquid pressure in the liquid chamber and the gas pressure in the gas chamber. Thus, it is possible to prevent breakage, etc. of the bellows.

At the time of using the accumulator, a temperature in the housing may become high, and at the time of closely attaching the sealing member to the sealing face, stress is applied and the elastic member is elastically deformed. Thus, upon manufacture of the sealing member, an adhesive is applied onto the surface of the substrate so that the elastic member is strongly vulcanization bonded to the surface of the substrate. Upon such manufacture of the sealing member, application of the adhesive to the substrate is performed by brushing, spraying, immersing, etc. of the adhesive. Thus, the adhesive is substantially uniformly applied to surfaces of plural substrates.

CITATION LIST

Patent Literature

Patent Citation 1: JP 3148349 U (Page 3, FIG. 1)

SUMMARY OF INVENTION

Technical Problem

However, in Patent Citation 1, the substrate of the sealing member is formed in a disc shape which has a rectangular shape in a sectional view, and upper and lower surfaces of the substrate are planar surfaces. Thus, in a state where plural substrates overlapped with each other in a process of applying an adhesive to the substrates, planar surfaces of the substrates are abutted with each other and there is a possibility that the adhesive does not run through the abutted part. When the adhesive is not substantially uniformly applied to the surface of the substrate, in the sealing member in which the elastic member is vulcanization bonded to the substrate, a part where bonding force is strong between the surface of the substrate and the elastic member and a part where the bonding force is weak are non-uniformly distributed. At the time of using the accumulator, when the sealing member is repeatedly attached to and detached from the sealing face, repetition stress is applied to the elastic member, and the part of the elastic member where the bonding force is weak is easily detached from the surface of the substrate. Thus, there is a problem that the life of the accumulator is shortened.

The present invention is achieved focusing on such a problem, and an object thereof is to provide an accumulator whose life is long.

Solution to Problem

In order to solve the foregoing problem, an accumulator according to a first aspect of the present invention, comprises a housing having a sealing face and a fluid inlet/outlet passage, a bellows fixed at least one end to the housing such that an inner space of the housing is hermetically partitioned by the bellows into an interior and an exterior of the bellows, the bellows including a bellows main body capable of expanding and contracting and a bellows cap including an annular seal holder, and a sealing member formed by covering a disc-shaped substrate with an elastic body that is opposed to and capable of being closely attached to the sealing face of the housing, the sealing member is held by a holding portion of the annular seal holder on an inner diameter side of the annular seal holder, the fluid inlet/outlet passage of the housing being closed upon a close attachment of the elastic body to the sealing face.

At least a center part of a surface of the substrate opposing the sealing face is a curved surface having an arc shape in a sectional view.

According to the first aspect, at least the center part of the surface of the substrate opposing the sealing face which is formed in the housing is a curved surface having an arc shape in a sectional view. Thereby, even in a state where plural substrates are overlapped with each other in a process of applying an adhesive to the substrates, a gap is easily formed between the substrates, and it is possible to let the adhesive run through from the gap and to substantially uniformly apply the adhesive to surfaces of the substrates. Thus, it is possible to make bonding force of the elastic member to the surfaces of the substrates substantially uniform so that the elastic member is not easily detached from the surfaces of the substrates. Therefore, it is possible to extend the life of the accumulator.

In the accumulator according to a second aspect of the present invention, the surface of the substrate opposing the sealing face has an arc shape in the sectional view over the radial direction.

According to the second aspect, at least the surface of the substrate to which the adhesive is applied for bonding the elastic member is a curved surface having an arc shape in a sectional view over the radial direction. Thereby, even in a state where the plural substrates are overlapped with each other in the process of applying the adhesive to the substrates, planar faces of the substrates are not abutted with each other over the radial direction. Thus, a gap is easily formed between the substrates.

In the accumulator according to a third aspect of the present invention, the substrate has an arc shape in the sectional view in which center of the face opposing the sealing surface of the substrate is a peak.

According to the third aspect, even in a state where the plural substrates are overlapped with each other in the process of applying the adhesive to the substrates, a gap is easily formed between the substrates. Thus, the adhesive easily runs through the surfaces of the substrates over the radial direction.

In the accumulator according to a fourth aspect of the present invention, is in addition to the surface of the substrate opposing the sealing face, another surface of the substrate remote from the sealing face has an arc shape in the sectional view.

According to the fourth aspect, even in a state where the plural substrates are overlapped with each other in the process of applying the adhesive to the substrates, it is possible to make curved faces abutted with each other. Thus, a gap is easily formed between the substrates.

In the accumulator according to a fifth aspect of the present invention, a through hole passing through in the radial direction is provided in the seal holder, and a communication passage extending in the radial direction so as to partially form a space providing communication between the through hole and the fluid inlet/outlet passage is provided in the seal holder or the sealing face.

According to the fifth aspect, in a state where the elastic member of the sealing member is melt and burnt out due to a high temperature of fire, etc. and the exposed substrate is abutted with an upper face of the holding portion of the seal holder or the sealing face, it is possible to form a pressure releasing flow passage to release a fluid flowing in from the through hole which is provided in the seal holder to the fluid inlet/outlet passage through the space formed by the communication passage which is provided in the seal holder or the sealing face. In addition, since the face of the substrate opposing the sealing face is a curved surface having an arc shape in a sectional view, the pressure releasing flow passage is easily formed between the substrate and the sealing face.

In the accumulator according to a sixth aspect of the present invention, the fluid inlet/outlet passage has an opening portion is formed in a funnel shape gradually spreading upward toward an open thereof.

According to the sixth aspect, in a state where the elastic member of the sealing member is melt and burnt out due to a high temperature of fire, etc. and the opening portion of the fluid inlet/outlet passage is covered by the exposed substrate, and even in a case where the substrate is warped to the fluid inlet/outlet passage side due to a high temperature, etc., by the funnel shape, the opening portion of the fluid inlet/outlet passage is not easily closed.

In the accumulator according to a seventh aspect of the present invention, a groove portion extending along an inclined portion of the funnel shape of the fluid/outlet passage is provided in the opening portion.

According to the seventh aspect, in a state where the elastic member of the sealing member is melt and burnt out due to a high temperature of fire, etc. and the opening portion of the fluid inlet/outlet passage is covered by the exposed substrate, and even in a case where the opening portion of the fluid inlet/outlet passage is substantially closed by the warped substrate, it is possible to release the fluid to the fluid inlet/outlet passage through the groove portion.

BRIEF DESCRIPTION OF DRAWINGS

FIG. 3A is the sectional view showing a state where a container housing plural substrates is immersed in the adhesive; and FIG. 3B is the sectional view showing a state where the adhesive is applied to surfaces of the plural substrates.

FIG. 5A is a partial sectional view showing a state where the sealing member and a sealing face are closely attached to each other; and FIG. 5B is the partial sectional view showing a state where a rubber-like elastic body forming the sealing member is melt and burnt out and a pressure releasing flow passage is formed.

DESCRIPTION OF EMBODIMENTS

Modes for carrying out the accumulator according to the present invention will be described below based on embodiments.

First Embodiment

An accumulator according to a first embodiment of the present invention will be described with reference to FIGS. 1 to 4. Hereinafter, the near side of the paper plane of FIG. 1 will serve as the front face side (front side) of the accumulator, and description will be given with the up and down direction and the left and right direction when seen from the front side as a standard.

An accumulator 1 is used in, for example, an automobile hydraulic system, an industrial equipment hydraulic system, etc., as a pressure storage device, a pulsation damper, etc. The accumulator 1 is a metal bellows type accumulator in which a metal bellows is used as a bellows main body 31.

Figure 1:
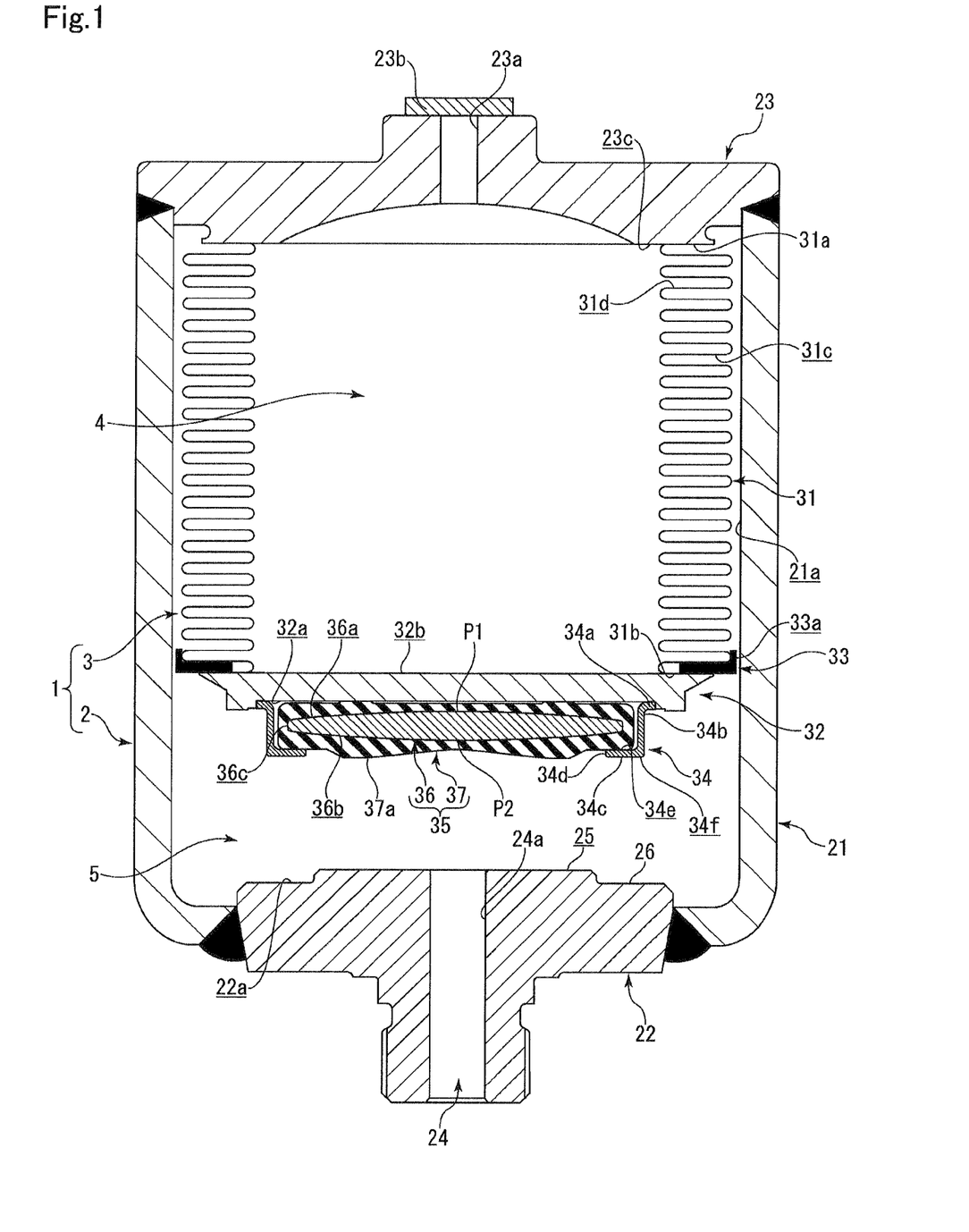
FIG. 1 is a sectional view showing a structure of an accumulator according to a first embodiment of the present invention.

As shown in FIG. 1, the accumulator 1 includes a housing 2, and a bellows 3 housed in the housing 2. FIG. 1 shows a state where the bellows main body 31 to be described later is contracted by pressure of a stored liquid, etc.

The housing 2 includes a cylindrical shell 21, an oil port member 22 welded and fixed so as to close a lower end of the shell 21, and a gas enclosing member 23 welded and fixed so as to close an upper end of the shell 21.

The gas enclosing member 23 is provided with a gas enclosing port 23a for charging high-pressure gas (for example, nitrogen gas) to a gas chamber 4 (described later) formed in the housing 2. The gas enclosing port 23a is closed by a gas plug 23b after charging the high-pressure gas.

The oil port member 22 is provided with a fluid inlet/outlet passage 24 for letting a liquid (for example, working oil) flow into and out of a pressure pipe (not shown) in the housing 2.

The oil port member 22 is provided with an annular sealing face 25 formed on the outer diameter side of an opening portion 24a of the fluid inlet/outlet passage 24. Further, on the outer diameter side of the sealing face 25, an annular face portion 26 is provided with a position lower than the sealing face 25.

The bellows 3 comprises a metal bellows main body 31 formed in a substantially cylindrical shape, and a metal bellows cap 32 formed in a disc shape.

The bellows main body 31 is welded and fixed to an inner face 23c of the gas enclosing member 23 so as to close a fixed end 31a forming an upper end, and welded and fixed to an upper face 32b of the bellows cap 32 so as to close a playing end 31b forming a lower end in a state where an annular protection ring 33 is sandwiched inbetween.

The protection ring 33 protects the bellows main body 31 so that the bellows main body 31 is not brought into direct contact with an inner wall face 21a of the shell 21. An outer circumferential face 33a of the protection ring 33 and the inner wall face 21a of the shell 21 are slightly separated from each other in the radial direction, and hence the protection ring 33 is capable of smoothly sliding without preventing extension and contraction operations of the bellows 3.

An annular seal holder 34 formed in a crank shape in a sectional view is fitted to a lower face 32a of the bellows cap 32. A disc-shaped sealing member 35 is attached and fixed to the seal holder 34.

The seal holder 34 is formed by pressing a metal disc plate into a crank shape in a sectional view. The seal holder includes an outward-flange-shaped fixed portion 34a forming an upper end of the seal holder 34, the fixed portion 34a being welded and fixed to the lower face 32a of the bellows cap 32, a tubular portion 34b extending downward from the fixed portion 34a and forming a side portion of the seal holder 34, and an inward-flange-shaped holding portion 34c forming a lower end of the seal holder 34, the holding portion being capable of holding the sealing member 35.

The seal holder 34 is provided with an opening portion 34d formed by an inner diameter part of the holding portion 34c. Part of the sealing member 35 held by the holding portion 34c (rubber-like elastic body 37) is exposed to the lower side from the opening portion 34d. An outer diameter of the sealing member 35 is larger than an inner diameter of the holding portion 34c, that is, an inner diameter of the opening portion 34d. Therefore, in the seal holder 34, by welding and fixing the fixed portion 34a to the lower face 32a of the bellows cap 32 in a state where the sealing member 35 is mounted on an upper face 34e of the holding portion 34c, it is possible to sandwich and hold the sealing member 35 between the lower face 32a of the bellows cap 32 and the upper face 34e of the holding portion 34c.

The sealing member 35 is formed by attaching (vulcanization bonding) the rubber-like elastic body 37 (elastic member) to part or all of a surface of a disc-shaped metal substrate 36. A structure of the sealing member 35 will be described in detail later.

An internal space of the housing 2 is partitioned by the bellows 3 (the bellows main body 31 and the bellows cap 32) into the gas chamber 4 communicating with the gas enclosing port 23a and a liquid chamber 5 communicating with the fluid inlet/outlet passage 24 in a sealed state.

The gas chamber 4 is defined by the inner face 23c of the gas enclosing member 23, an inner circumferential face 31d of the bellows main body 31, and the upper face 32b of the bellows cap 32. The high-pressure gas charged from the gas enclosing port 23a is enclosed in the gas chamber.

The liquid chamber 5 is defined by the inner wall face 21a of the shell 21, an inner face 22a of the oil port member 22, an outer circumferential face 31c of the bellows main body 31, and the lower face 32a of the bellows cap 32 (the seal holder 34, the sealing member 35). The liquid flows into and out of the pressure pipe via the fluid inlet/outlet passage 24.

The accumulator 1 adjusts a liquid pressure in such a manner that the bellows cap 32 is moved to a certain position and the gas pressure of the gas chamber 4, and the liquid pressure of the liquid chamber 5 are balanced by the expansion and contraction operations of the bellows 3 provided in the housing 2.

Figure 2:
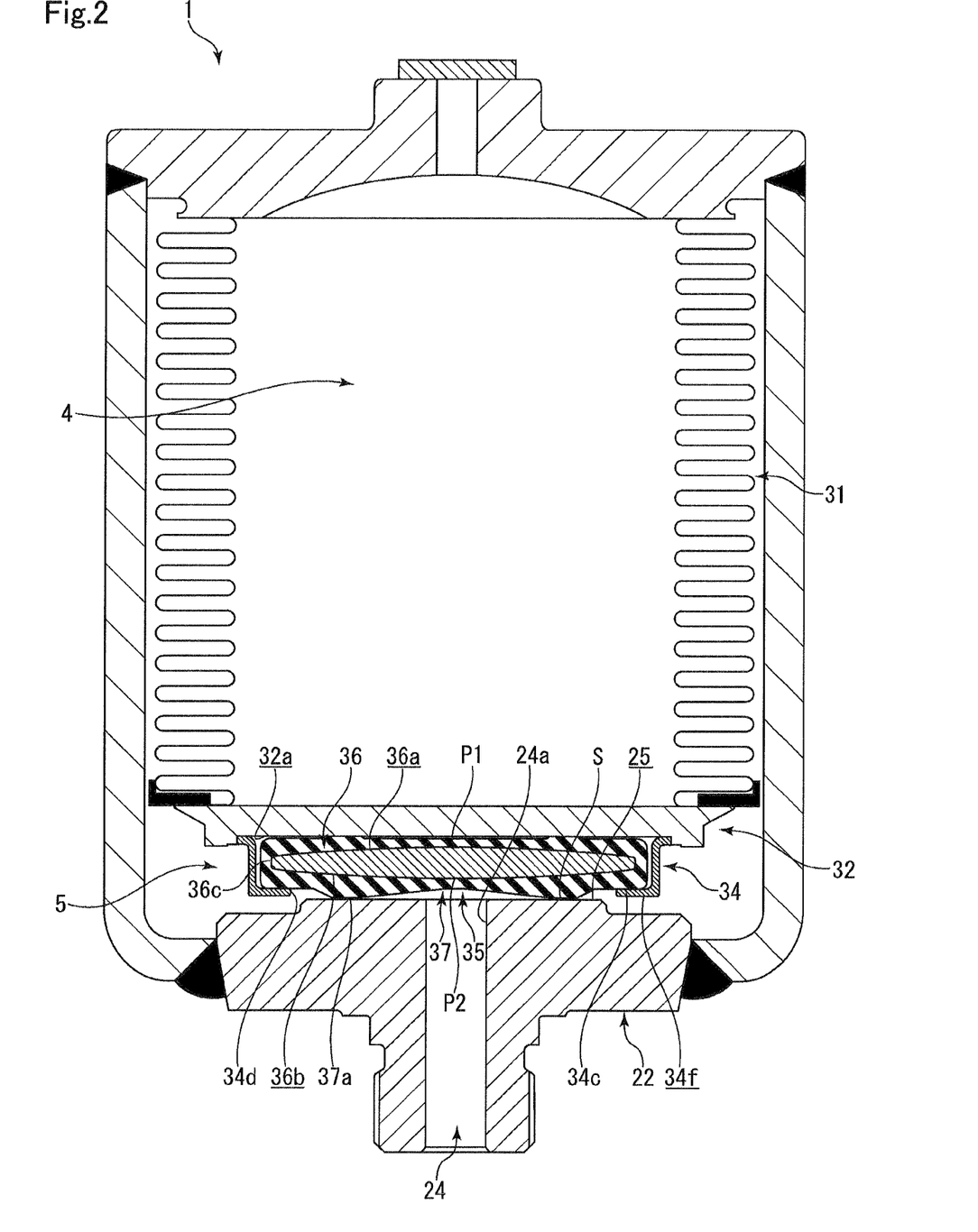
FIG. 2 is a sectional view showing a state where a sealing member and a sealing face of the accumulator shown in FIG. 1 are closely attached to each other.
Figure 3:
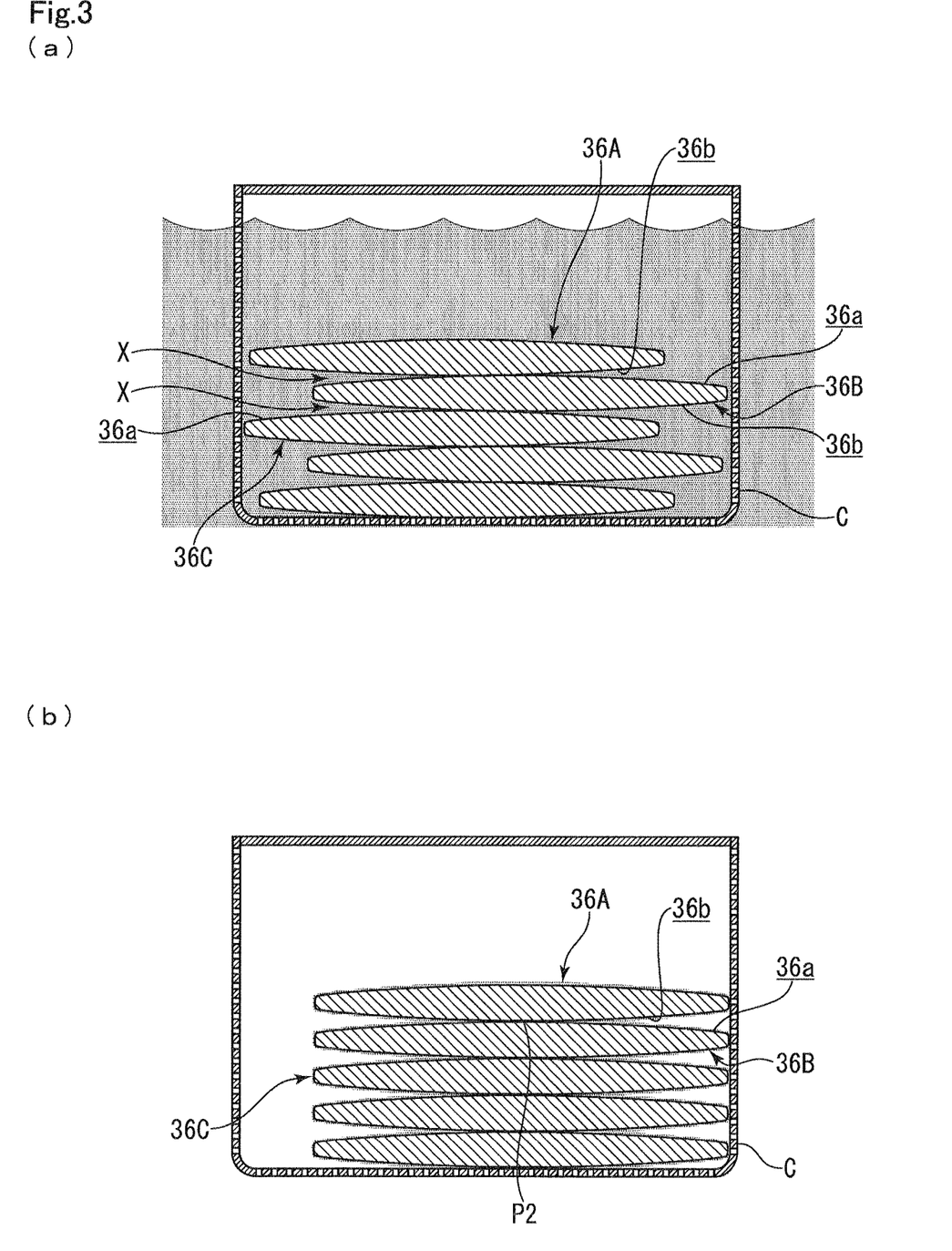
FIG. 3 shows a process of applying an adhesive to substrates upon manufacture of the sealing member in the first embodiment.
Figure 4:
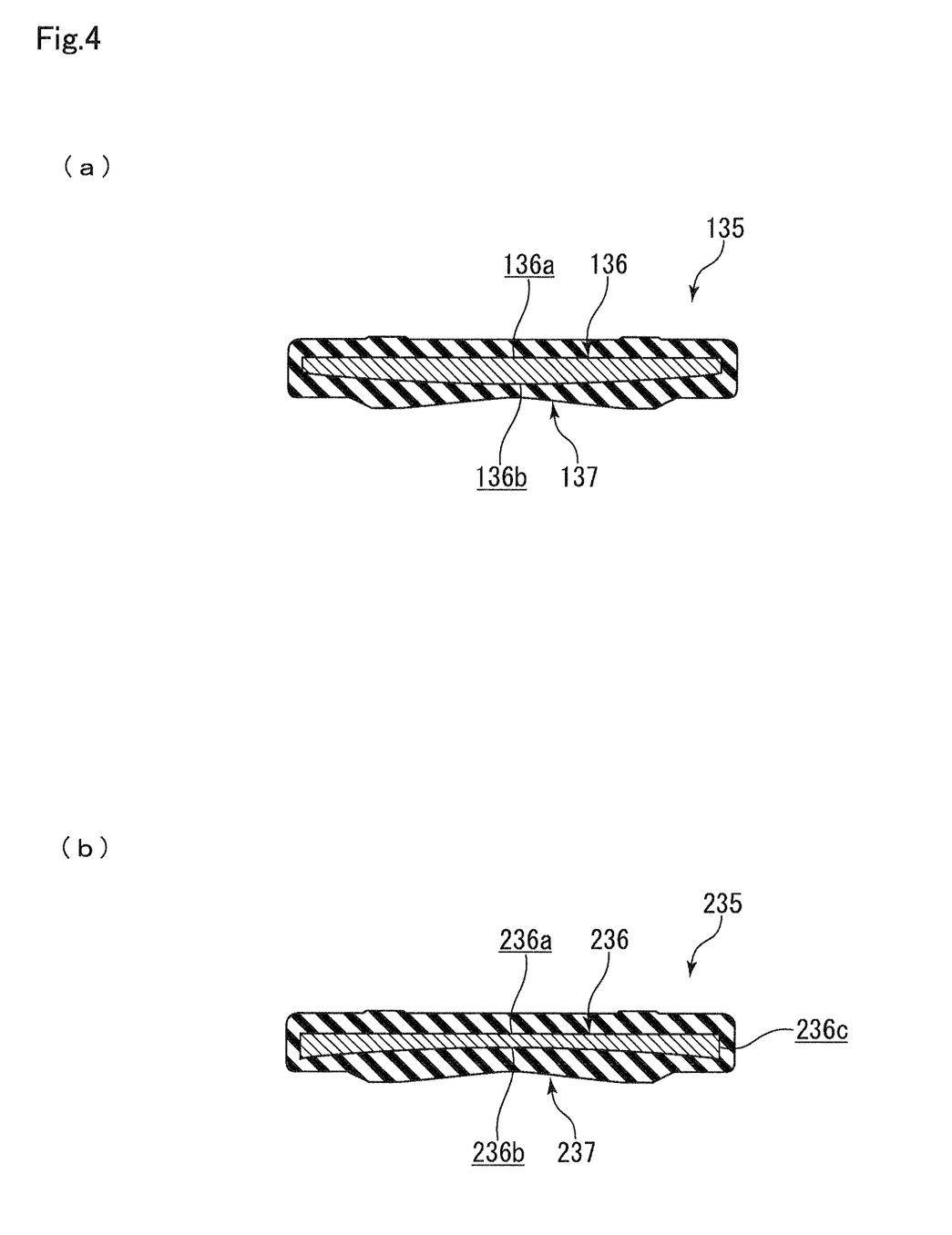
FIGS. 4A and 4B are sectional views showing modified examples 1 and 2 different from the sealing member in FIG. 3.

For example, as shown in FIG. 2, when the liquid in the pressure pipe is discharged, the bellows cap 32 receives the gas pressure of the gas chamber 4 and moves downward, and the bellows main body 31 is expanded. Thereby, the sealing member 35 (an annular projecting portion 37a of the rubber-like elastic body 37 to be described later) attached to the lower face 32a of the bellows cap 32 and the sealing face 25 of the oil port member 22 are closely attached to each other so as to form an annular sealing portion S, and the opening portion 24a of the fluid inlet/outlet passage 24 is closed. Thereby, part of the liquid is locked in the liquid chamber 5, and pressure of this locked liquid and the gas pressure of the gas chamber 4 are balanced. Thus, no excessive stress is applied to the bellows main body 31, so that it is possible to suppress breakage of the bellows main body 31. A normal operation of the accumulator in which, as described above, by extending and contracting the bellows 3 and closely attaching the sealing member 35 and the sealing face 25 to each other, the sealing portion S is formed and the opening portion 24a of the fluid inlet/outlet passage 24 is closed will be referred to as the steady operation of the accumulator 1.

Next, the structure of the sealing member 35 will be described in detail. As shown in FIGS. 1 and 2, the substrate 36 of the sealing member 35 is made of metal and formed in a disc shape, and both an upper face 36a and a lower face 36b are formed in a curved face having an arc shape in a sectional view over the radial direction.

In detail, the upper face 36a of the substrate 36 is formed as a curved face having an arc shape in a sectional view, the arc shape projecting upward from an upper edge of an outer circumferential face 36c of the substrate 36 over the radial direction (diameter) in such a manner that radial center P1 of the upper face 36a is a peak. The lower face 36b of the substrate 36 is formed as one curved face having an arc shape in a sectional view, the arc shape projecting downward from a lower edge of the outer circumferential face 36c of the substrate 36 over the radial direction (diameter) in such a manner that radial center P2 of the lower face 36b is a peak, that is, a so-called dome-shaped outer surface. A diameter of the substrate 36 is larger than the inner diameter of the holding portion 34c, that is, the inner diameter of the opening portion 34d.

The rubber-like elastic body 37 forming the sealing member 35 is attached to the entire surface (the upper face 36a, the lower face 36b, and the outer circumferential surface 36c) of the substrate 36 described above. The annular projecting portion 37a projecting downward (to the sealing face 25 side) is formed in the rubber-like elastic body. By partially enhancing sealing face pressure of the sealing portion S at the time of closely attaching the sealing member 35 and the sealing face 25, a sealing performance is improved.

As shown in FIG. 2, at steady operation of the accumulator 1, in a state where the sealing member 35 and the sealing face 25 are closely attached to each other so as to form the sealing portion S, a lower end face 34f of the holding portion 34c of the seal holder 34 is separated from the annular face portion 26 of the oil port member 22 in the up and down direction. By this, the sealing member 35 and the sealing face 25 are closely attached to each other. Thus, it is possible to reliably make sealing in the sealing portion S.

At steady operation of the accumulator 1, the sealing member 35 is repeatedly attached to and detached from the sealing face 25 in order to adjust the liquid pressure in the liquid chamber 5 by opening and closing the opening portion 24a of the fluid inlet/outlet passage 24 of the oil port member 22. In particular, when upon receiving the gas pressure in the gas chamber 4, the sealing member 35 is closely attached to the sealing face 25 and the opening portion 24a of the fluid inlet/outlet passage 24 is closed, a stress (pressing force) is applied to the rubber-like elastic body 37 forming the sealing member 35, and the rubber-like elastic body 37 is elastically deformed and easily detached from the surface of the substrate 36. Thus, by applying an adhesive to the surface of the substrate 36 upon manufacture of the sealing member 35, the rubber-like elastic body 37 is attached (vulcanization bonded) to the surface of the substrate 36 as described above. The substrate 36 and the rubber-like elastic body 37 are made of different materials from each other (metal and resin). Thus, in order to strongly bond the rubber-like elastic body 37 to the surface of the substrate 36, vulcanization bonding is used.

Next, a method of manufacturing the sealing member 35 will be described. For example, upon manufacture of the sealing member 35, as shown in FIG. 3A, first, in order to improve efficiency of applying the adhesive to substrates 36A, 36B, 36C, . . . , a container C in which the plural substrates 36A, 36B, 36C, . . . are housed is immersed in the adhesive, and the adhesive is applied to surfaces of the plural substrates 36A, 36B, 36C, . . . (refer to FIG. 3B). The substrates 36A, 36B, 36C, . . . to which the adhesive is applied on the surfaces are respectively set in a mold (not shown) fit for a shape of the rubber-like elastic body 37, so that the rubber-like elastic body 37 is vulcanization bonded to the surfaces of the substrates 36A, 36B, 36C, . . . .

As described above, regarding the substrates 36A, 36B, 36C, . . . forming the sealing member 35, both the upper face 36a and the lower face 36b are formed in a curved face having an arc shape in a sectional view over the radial direction. Thus, as shown in FIG. 3A, even in a state where the plural substrates 36A, 36B, 36C, . . . housed in the container C are overlapped with each other, it is possible to form gaps X, X, for example, between the upper face 36a of the substrate 36B and the lower face 36b of the substrate 36A and between the lower face 36b of the substrate 36B and the upper face 36a of the substrate 36c.

Specifically, for example, in a case where the upper faces 36a and the lower faces 36b of the substrates 36A, 36B, 36C, . . . are respectively formed in a planar shape, and in a state where the substrates 36A, 36B, 36C, . . . housed in the container C are overlapped with each other, planar faces of the substrates 36A, 36B, 36C, . . . are closely attached to each other and the adhesive does not easily run through the abutted part. In this case, the adhesive is not substantially uniformly applied to the surfaces of the substrates 36A, 36B, 36C, . . . . Thus, bonding force of the rubber-like elastic body 37 to the surfaces of the substrates 36A, 36B, 36C, . . . after vulcanization bonding is non-uniform. Thus, there is a possibility that at the time of elastic deformation, the rubber-like elastic body 37 is easily detached from the surface of the substrate 36 at a point where the bonding force is weak. In this case, in order to substantially uniformly apply the adhesive to the surfaces of the substrates 36A, 36B, 36C, . . . , there is a need for performing a task of applying the adhesive on an individual basis, and the efficiency of applying the adhesive to the substrate 36 is lowered.

Meanwhile, regarding the substrates 36A, 36B, 36C, . . . of the present embodiment, both the upper face 36a and the lower face 36b are formed in a curved face having an arc shape in a sectional view over the radial direction. Thus, even in a state where the substrates 36A, 36B, 36C, . . . housed in the container C are overlapped with each other (refer to FIG. 3A), by abutment of the curved faces (the upper face 36a and the lower face 36b) with each other, the gaps X, X are easily formed between the substrates 36A, 36B, 36C, . . . . By letting the adhesive run through from the gaps X,X, it is possible to substantially uniformly apply the adhesive to the surfaces of the substrates 36A, 36B, 36C, . . . . Thus, it is possible to make the bonding force of the rubber-like elastic body 37 to the surfaces of the substrates 36A, 36B, 36C, . . . substantially uniform, and to make the rubber-like elastic body 37 not easily detached from the surfaces of the substrates 36A, 36B, 36C, . . . . Therefore, it is possible to extend the life of the accumulator 1.

The upper face 36a and the lower face 36b of the substrate 36 are respectively formed in a curved face having an arc shape in a sectional view, the arc shape projecting upward or downward in such a manner that the radial center P1 or P2 of the upper face 36a or the lower face 36b is the peak. Thus, as shown in FIG. 3A, even in a state where the plural substrates 36A, 36B, 36C, . . . are overlapped with each other in the process of applying the adhesive to the substrates 36A, 36B, 36C, . . . , the gaps X, X are easily formed between the substrates 36A, 36B, 36C, . . . by the upper faces 36a and the lower faces 36b. Thus, the adhesive easily runs through the surfaces of the substrates 36A, 36B, 36C, . . . over the radial direction.

The center P2 in the lower face 36b of the substrate 36 is brought into substantially-point-contact with the upper face 36a of the substrate 36 on the lower side. Thus, the adhesive easily runs through the lower face 36b of the substrate 36 over the radial direction (for example, refer to the substrate 36A of FIG. 3B). Since the lower face 36b of the substrate 36 projects downward, in a state where the sealing member 35 is closely attached to the sealing face 25, stresses in the opposing directions act on the center P2 from both the sides in the radial direction. Therefore, relative displacement between the rubber-like elastic body 37 and the substrate 36 is not easily generated in the structure.

As described above, when upon manufacture of the sealing member 35, the substrate 36 to which the adhesive is applied on the surface is set in the mold, a gap between the substrate 36 and the mold is expanded by the curved surface of the substrate 36. Thus, rubber easily goes through around the substrate.

There are other modified examples of the sealing member 35 as described below. As shown in FIG. 4A, in a sealing member 135 of a modified example 1, an upper face 136a of a substrate 136 is formed in a planar shape, and a lower face 136b which is a face opposing the sealing face 25 is formed as a curved face having an arc shape in a sectional view, the arc shape projecting downward over the radial direction.

Further, as shown in FIG. 4B, in a sealing member 235 of a modified example 2, an upper face 236a of a substrate 236 is formed in a planar shape, and a lower face 236b which is a face opposing the sealing face 25 is formed as a curved face having an arc shape in a sectional view so as to be recessed upward over the radial direction.

By this, in the substrate 136, 236 of the sealing member 135, 235 of the modified example 1, 2, at least the face opposing the sealing face 25, that is, the lower face 136b, 236b from which the rubber-like elastic body 137, 237 is elastically deformed and easily detached by closely attaching to the sealing face 25 at steady operation of the accumulator 1 is formed as a curved face having an arc shape in a sectional view. Therefore, although not shown for convenience in explanation, upon manufacture of the sealing member 135, 235, even in a state where the plural substrates 136, 136, . . . or the plural substrates 236, 236, . . . are overlapped with each other, by abutment of the curved faces (the lower faces 136b, 236b) with each other, gaps are easily formed between the substrates 136, 136, . . . or the substrates 236, 236, . . . on the lower faces 136b, 236b side. By letting the adhesive run through from the gaps, it is possible to substantially uniformly apply the adhesive to the lower faces 136b, 236b of the substrates 136, 136, . . . or the substrates 236, 236, . . . . Thus, it is possible to make vulcanization bonding of the rubber-like elastic body 37 to at least the lower faces 136b, 236b of the substrates 136, 136, . . . or the substrates 236, 236, . . . substantially uniform, and to make the rubber-like elastic body 37 not easily detached from the surfaces of the substrates 136, 136, . . . or the substrates 236, 236, . . . .

In the substrate 136, 236 of the sealing member 135, 235 of the modified example 1, 2, since the upper face 136a, 236a is a planar face, processing is easily performed, and it is possible to let the force act substantially uniformly over the radial direction from the lower face 32a of the bellows cap 32. Since the lower face 136b of the substrate 136 of the modified example 1 is a curved face projecting downward, the adhesive easily runs through over the radial direction as well as the lower face 36b of the substrate 36 of the first embodiment.

Second Embodiment

Figure 5:
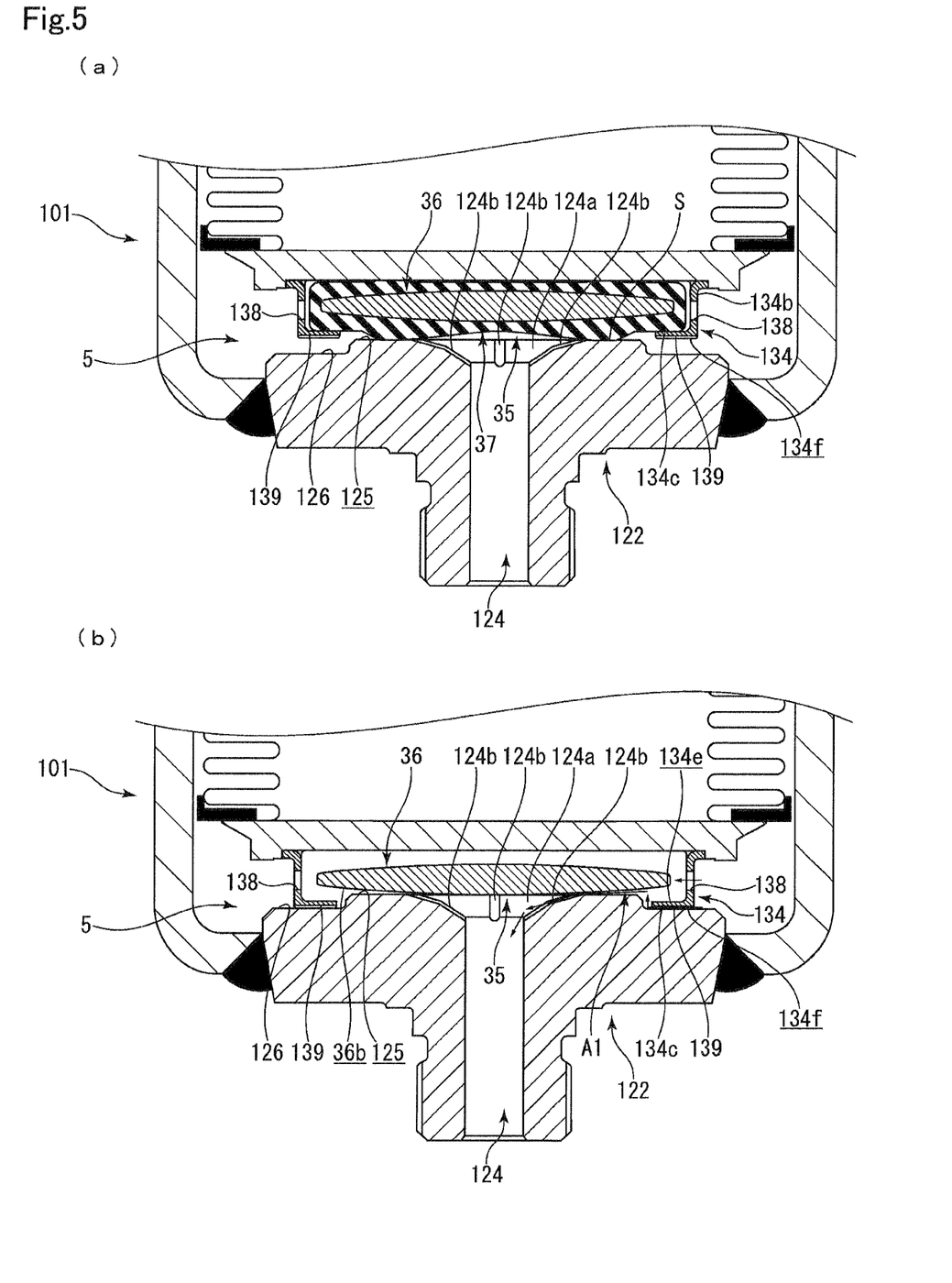
FIG. 5 is of an accumulator according to a second embodiment of the present invention.

Next, an accumulator according to a second embodiment of the present invention will be described with reference to FIG. 5. The same constituent parts as the constituent parts shown in the above embodiment will be given the same reference signs, and duplicated description will be omitted.

As shown in FIG. 5A, in an accumulator 101 in the second embodiment, a fluid inlet/outlet passage 124 provided in an oil port member 122 includes an opening portion 124a is formed in a funnel shape gradually spreading upward, and plural groove portions 124b, 124b, . . . extending along inclination of the funnel shape are formed.

In a tubular portion 134b of a seal holder 134, plural through holes 138, 138, . . . passing through in the radial direction project at predetermined intervals in the circumferential direction. The liquid chamber 5 (the outer diameter side of the seal holder 134) and the inner diameter side of the seal holder 134 communicate with each other via the through holes 138, 138, . . . .

On a lower end face 134f of a holding portion 134c of the seal holder 134, plural communication recess portions 139, 139, . . . (communication passages) extending in the radial direction are formed at predetermined intervals in the circumferential direction corresponding to circumferential positions of the through holes 138, 138, . . . described above. That is, the through holes 138, 138, . . . and the communication recess portions 139, 139, . . . are arranged at positions close to each other in the circumferential direction.

At steady operation of the accumulator 101, the liquid of the liquid chamber 5 flowing in from the through holes 138, 138, . . . which are provided in the tubular portion 134b of the seal holder 134 is blocked by the sealing member 35 (rubber-like elastic body 37).

A sealing portion S of the sealing member 35 and a sealing face 125 is formed on the inner diameter side of the communication recess portions 139, 139, . . . . Thus, at steady operation of the accumulator 101, the liquid of the liquid chamber 5 flowing in from a part where the lower end face 134f of the holding portion 134c of the seal holder 134 and an annular face portion 126 of the oil port member 122 are separated from each other is also blocked by the sealing member 35 and incapable of flowing into the fluid inlet/outlet passage 124.

Next, a pressure releasing flow passage formed for releasing the liquid of the liquid chamber 5 to the fluid inlet/outlet passage 124 in a state where the rubber-like elastic body 37 forming the sealing member 35 is melt and burnt out due to a high temperature of fire, etc. and the substrate 36 is exposed will be described. Hereinafter, only flows of the liquid in the pressure releasing flow passage formed on the right side on the paper plane will be shown by arrows in the figures.

As shown in FIG. 5B, in a state where the rubber-like elastic body 37 forming the sealing member 35 is melt and burnt out due to a high temperature of fire, etc. and the substrate 36 is exposed, the substrate 36 is mounted on the opening portion 124a of the fluid inlet/outlet passage 124 of the oil port member 122. In detail, the lower face 36b of the substrate 36 is a curved face, and the opening portion 124a is formed in the funnel shape gradually spreading upward. Thus, the lower face 36b of the substrate 36 is abutted with an opening edge of the opening portion 124a of the fluid inlet/outlet passage 124. Since the lower face 36b of the substrate 36 is a curved face, a gap is easily formed between the lower face 36b of the substrate 36, and the sealing face 125 and an upper face 134e of the holding portion 134c of the seal holder 134, and the space A1 communicating with the fluid inlet/outlet passage 124 via the plural groove portions 124b, 124b, . . . which extend along the inclination of the funnel shape of the opening portion 124a is formed.

Since the rubber-like elastic body 37 (annular projecting portion 37a) closely attached to the sealing face 125 is melt and burnt out, the lower end face 134f of the holding portion 134c of the seal holder 134 is moved downward more than at steady operation and abutted with the annular face portion 126 of the oil port member 122.

Further, since the rubber-like elastic body 37 of the sealing member 35 is melt and burnt out, it is possible to let the liquid of the liquid chamber 5 flowing in from the through holes 138, 138, . . . of the seal holder 134 and the communication recess portions 139, 139, . . . provided on the lower end face 134f of the holding portion 134c of the seal holder 134 flow into the space A1 formed between the lower face 36b of the substrate 36 and the sealing face 125, the space communicating with the fluid inlet/outlet passage 124 via the groove portions 124b, 124b, . . . of the opening portion 124a.

By this, in a state where the rubber-like elastic body 37 forming the sealing member 35 is melt and burnt out due to a high temperature of fire, etc. and the lower face 36b of the exposed substrate 36 is mounted on the opening portion 124a of the fluid inlet/outlet passage 124 of the oil port member 122, it is possible to form a pressure releasing flow passage to release the liquid of the liquid chamber 5 flowing in from the through holes 138, 138, . . . which are provided in the tubular portion 134b of the seal holder 134 to the fluid inlet/outlet passage 124 through the space A1 formed between the lower face 36b of the substrate 36 and the sealing face 125 and the upper face 134e of the holding portion 134c of the seal holder 134, the space communicating with the fluid inlet/outlet passage 124 via the groove portions 124b, 124b, . . . of the opening portion 124a, and a pressure releasing flow passage to release the liquid of the liquid chamber 5 to the fluid inlet/outlet passage 124 through the space A1 communicating with the inner diameter side directly from the outer diameter side of the communication recess portions 139, 139, . . . provided on the lower end face 134f of the holding portion 134c of the seal holder 134. In addition, since it is possible to release the liquid of the liquid chamber 5 to the fluid inlet/outlet passage 124, it is possible to suppress a radical increase in the pressure of the liquid chamber 5, and by extension, the pressure of the gas chamber 4.

In the accumulator 101, since it is possible to form two types of pressure releasing flow passages, it is possible to increase a flow rate of the pressure releasing flow passages.

The through holes 138, 138, . . . are provided in the tubular portion 134b of the seal holder 134. Thus, at the time of melting and burning the rubber-like elastic body 37, the liquid of the liquid chamber 5 immediately flows into the inner diameter side of the seal holder 134 from the through holes 138, 138, . . . and it is possible to promptly lower the pressure of the liquid chamber 5. Further, even when the volume of the gas in the gas chamber 4 is increased due to a high temperature and the bellows main body 31 is inflated in the outer diameter direction, it is possible to appropriately release the liquid of the liquid chamber 5 to the fluid inlet/outlet passage 124.

By releasing the liquid of the liquid chamber 5 to the fluid inlet/outlet passage 124 by the pressure releasing flow passage, balance is lost between the liquid pressure in the liquid chamber 5 on the outside of the bellows main body 31 and the gas pressure in the gas chamber 4 on the inside of the bellows main body 31, and the bellows main body 31 is broken. By this, the gas chamber 4 and the liquid chamber 5 communicate with each other through the broken part of the bellows main body 31, and it is possible to release the high-pressure gas in the gas chamber 4 to the fluid inlet/outlet passage 124 by the pressure releasing flow passage formed in the liquid chamber 5. Therefore, it is possible to prevent breakage of the housing 2 due to an increase in the pressure in the gas chamber 4.

As described above, the plural through holes 138, 138, . . . and the plural communication recess portions 139, 139, . . . are provided in the circumferential direction. Thus, it is possible to ensure the flow rate of the pressure releasing flow passage, and to release the liquid of the liquid chamber 5 and the high-pressure gas of the gas chamber 4 to the fluid inlet/outlet passage 124 for a short time.

Since the through holes 138, 138, . . . and the communication recess portions 139, 139, . . . are closely aligned in the circumferential direction, it is possible to efficiently release the liquid of the liquid chamber 5 and the high-pressure gas of the gas chamber 4 to the fluid inlet/outlet passage 124 by the pressure releasing flow passage. Further, since the through holes 138, 138, . . . and the communication recess portions 139, 139, . . . are arranged in a substantially radial manner, it is possible to efficiently release the liquid of the liquid chamber 5 and the high-pressure gas of the gas chamber 4 to the fluid inlet/outlet passage 124.

Since the lower face 36b of the substrate 36 is a curved face, it is possible to ensure a large space from the sealing face 125 and the upper face 134e of the holding portion 134c of the seal holder 134. Thus, it is possible to increase the flow rate of the pressure releasing flow passage.

Further, since the lower face 36b of the substrate 36 is a curved face, it is possible to oscillate the substrate 36 by a pressure change in the liquid chamber 5, and the liquid of the liquid chamber 5 and the high-pressure gas of the gas chamber 4 flowing into the space A1 in a state where the lower face 36b of the substrate 36 is mounted on the opening portion 124a of the fluid inlet/outlet passage 124 of the oil port member 122. By this, it is possible to ensure a large space between the sealing face 125 and the upper face 134e of the holding portion 134c of the seal holder 134. Thus, it is possible to increase the flow rate of the pressure releasing flow passage and to release the liquid of the liquid chamber 5 and the high-pressure gas of the gas chamber 4 to the fluid inlet/outlet passage 124 for a short time.

The seal holder 134 is an annular member formed by pressing a metal disc plate, and has a simple structure. Thus, even in a situation where the rubber-like elastic body 37 forming the sealing member 35 is melt and burnt out due to a high temperature of fire, etc., the structure of the seal holder 134 is maintained and the pressure releasing flow passage is easily formed.

As described above, in the fluid inlet/outlet passage 124, the opening portion 124a is formed in the funnel shape gradually spreading upward, and the groove portions 124b, 124b, . . . extending along the inclination of the funnel shape are formed. Thus, in a state where the lower face 36b of the substrate 36 is mounted on the opening portion 124a of the fluid inlet/outlet passage 124, and even in a case where the substrate 36 is warped to the opening portion 124a side of the fluid inlet/outlet passage 124 due to a high temperature, etc., by the funnel shape, the opening portion 124a of the fluid inlet/outlet passage 124 is not easily closed. Even in a case where the opening portion 124a of the fluid inlet/outlet passage 124 is substantially closed by the lower face 36b of the warped substrate 36, it is possible to release the liquid of the liquid chamber 5 and the high-pressure gas of the gas chamber 4 to the fluid inlet/outlet passage 124 through the groove portions 124b, 124b, . . . . Thus, it is possible to reliably form the pressure releasing flow passage.

It is possible to form the pressure releasing flow passage by the substrate 36 of the sealing member 35, and the through holes 138, 138, . . . and the communication recess portions 139, 139, . . . of the seal holder 134. Thus, only by a task of replacing a sealing member 35 and a seal holder 134 in a conventional accumulator, it is possible to form a pressure releasing flow passage in the accumulator.

Regarding the through holes 138, 138, . . . and the communication recess portions 139, 139, . . . of the seal holder 134 forming the pressure releasing flow passage in the accumulator 101, only one of the through holes and the communication recess portions may be provided. The pressure releasing flow passage formed in the accumulator 101 is not limited to the pressure releasing flow passage described above but may be other flow passages.

As above, the embodiments of the present invention are described with the drawings. However, specific configurations are not limited to these embodiments but changes and additions within the range not departing from the gist of the present invention are included in the present invention.

For example, in the above embodiments of the present invention, the configuration in which the face (lower face 36b) of the substrate 36 opposing the sealing face 25 is a curved face having an arc shape in a sectional view over the radial direction is described. However, the present invention is not limited to this but part of at least the lower face of the substrate (preferably, at least the center part of the lower face) is only required to be a curved face having an arc shape in a sectional view. For example, the inner diameter side of the lower face of the substrate may be formed in an arc shape in a sectional view and the outer diameter side may be formed in a planar shape. In addition, the lower face of the substrate may be formed in a waveform in a sectional view.

In the above embodiments of the present invention, the example in which the lower face 36b of the substrate 36 is formed in a dome shape having an arc shape in a sectional view over the radial direction with the center P2 as the peak is described. However, the center part of the lower face is only required to be a curved face having an arc shape in a sectional view. For example, in the lower face of the substrate, a projecting end part of the dome shape may be formed as an edge line extending linearly in the radial direction, and the lower face may be a curved face having an arc shape in a sectional view when seen from the direction in which the edge line extends.

The rubber-like elastic body 37 is only required to be vulcanization bonded to at least the lower face 36b of the substrate 36. For example, the rubber-like elastic body may be vulcanization bonded to only the lower face 36b or from the lower face 36b to the outer circumferential face 36c.

To the surface (in particular, the lower face 36b) of the substrate 36, surface treatment for easily vulcanization bonding the rubber-like elastic body 37 may be performed.

The sealing member 135, 235 described as the modified example 1, 2 in the first embodiment may be used in the second embodiment.

Figure 6:
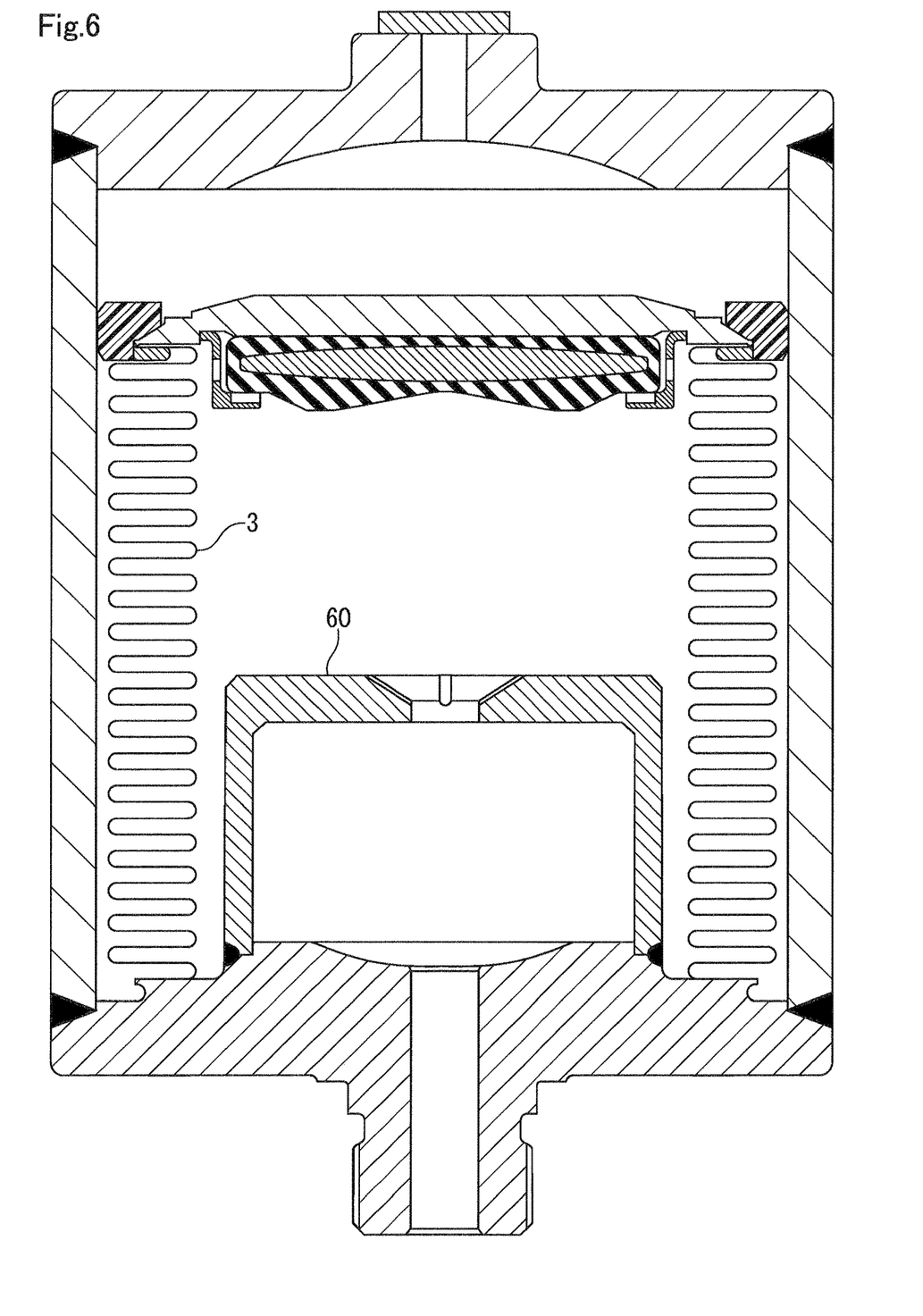
FIG. 6 is the sectional view showing a gas-outside type accumulator in which a liquid chamber is set on the inside of a bellows and a gas chamber is set on the outside of the bellows.

In the above embodiments of the present invention, the accumulators 1, 101 are described as the so-called gas-inside type accumulator in which the liquid chamber 5 is set on the outside of the bellows 3 and the gas chamber 4 is set on the inside of the bellows 3. However, the present invention is not limited to this but for example, the accumulators may be a gas-outside type accumulator in which a stay 60, etc. is provided in a bellows 3 to set a liquid chamber on the inside of the bellows and a gas chamber is set on the outside of the bellows (refer to FIG. 6).

The communication recess portions 139, 139, . . . provided on the lower end face 134f of the holding portion 134c of the seal holder 134 may be provided in the annular face portion 126 of the oil port member 122. Further, in the communication recess portions, a recess portion may be formed by plural projected portions.

The example in which the shell 21, the oil port member 22, and the gas enclosing member 23 are formed by respectively different members in the housing 2 is described. However, the shell 21 and the oil port member 22 or the gas enclosing member 23 may be a single member.

The bellows main body 31 is not limited to metal but may be made of, for example, resin, etc.

REFERENCE SIGNS LIST

1 Accumulator
2 Housing
3 Bellows
4 Gas chamber
5 Liquid chamber
22 Oil port member
24 Fluid inlet/outlet passage
24a Opening portion
25 Sealing face
26 Annular face portion
31 Bellows main body
32 Bellows cap
34 Seal holder
35 Sealing member
36 Substrate
36a Upper face
36b Lower face
37 Rubber-like elastic body (elastic member)
138 Through hole
139 Communication recess portion (communication passage)
A1 Space
P1, P2 Center
S Sealing portion
X Gap

The invention claimed is:

1. An accumulator comprising:
a housing having a sealing face and a fluid inlet/outlet passage;
a bellows fixed at least one end to the housing such that an inner space of the housing is hermetically partitioned by the bellows into an interior and an exterior of the bellows, the bellows including a bellows main body capable of expanding and contracting and a bellows cap including an annular seal holder; and
a sealing member formed by covering a disc-shaped substrate with an elastic body, the substrate having a first surface facing toward a side of the sealing face of the housing and a second surface opposed to the first surface, the elastic body of the sealing member being configured to be closely attached to the sealing face of the housing, the sealing member being held by a holding portion of the annular seal holder on an inner diameter side of the annular seal holder, the fluid inlet/outlet passage of the housing being closed upon a close attachment of the elastic body to the sealing face, wherein
the entire first surface of the substrate is defined by a curved surface protruded or recessed in an axial direction of the substrate.

2. The accumulator according to claim 1, wherein the first surface of the substrate is part of spherical surface.

3. The accumulator according to claim 2, wherein the first surface of the substrate has a protrusion peak or a recession peak in a center of the first surface.

4. The accumulator according to claim 2, wherein the entire second surface of the substrate is defined by a curved surface protruded in the axial direction of the substrate.

5. The accumulator according to claim 2, wherein
a through hole passing through in the radial direction is provided in the seal holder, and a communication passage extending in the radial direction so as to partially form a space providing communication between the through hole and the fluid inlet/outlet passage is provided in the seal holder or the sealing face.

6. The accumulator according to claim 5, wherein the fluid inlet/outlet passage has an opening portion formed in a funnel shape gradually spreading toward an open end thereof.

7. The accumulator according to claim 5, wherein a groove portion extending along an inclined portion of the funnel shape of the fluid inlet/outlet passage is provided in the opening portion.

8. The accumulator according to claim 1, wherein the first surface of the substrate has a protrusion peak or a recession peak in a center of the first surface.

9. The accumulator according to claim 8, wherein
the entire second surface of the substrate is defined by a curved surface protruded in the axial direction of the substrate.

10. The accumulator according to claim 8, wherein
a through hole passing through in the radial direction is provided in the seal holder, and a communication passage extending in the radial direction so as to partially form a space providing communication between the through hole and the fluid inlet/outlet passage is provided in the seal holder or the sealing face.

11. The accumulator according to claim 10, wherein the fluid inlet/outlet passage has an opening portion formed in a funnel shape gradually spreading toward an open end thereof.

12. The accumulator according to claim 11, wherein a groove portion extending along an inclined portion of the funnel shape of the fluid inlet/outlet passage is provided in the opening portion.

13. The accumulator according to claim 1, wherein the entire second surface of the substrate is defined by a curved surface protruded in the axial direction of the substrate.

14. The accumulator according to claim 13, wherein
a through hole passing through in the radial direction is provided in the seal holder, and a communication passage extending in the radial direction so as to partially form a space providing communication between the through hole and the fluid inlet/outlet passage is provided in the seal holder or the sealing face.

15. The accumulator according to claim 14, wherein the fluid inlet/outlet passage has an opening portion formed in a funnel shape gradually spreading toward an open end thereof.

16. The accumulator according to claim 15, wherein a groove portion extending along an inclined portion of the funnel shape of the fluid inlet/outlet passage is provided in the opening portion.

17. The accumulator according to claim 1, wherein
a through hole passing through in the radial direction is provided in the seal holder, and a communication passage extending in the radial direction so as to partially form a space providing communication between the through hole and the fluid inlet/outlet passage is provided in the seal holder or the sealing face.

18. The accumulator according to claim 17, wherein the fluid inlet/outlet passage has an opening portion formed in a funnel shape gradually spreading toward an open end thereof.

19. The accumulator according to claim 18, wherein a groove portion extending along an inclined portion of the funnel shape of the fluid inlet/outlet passage is provided in the opening portion.

* * * * *